(No Model.)
J. LOFTUS.
DEVICE FOR SEPARATING CREAM FROM MILK AND CHURNING THE CREAM.
No. 356,003. Patented Jan. 11, 1887.
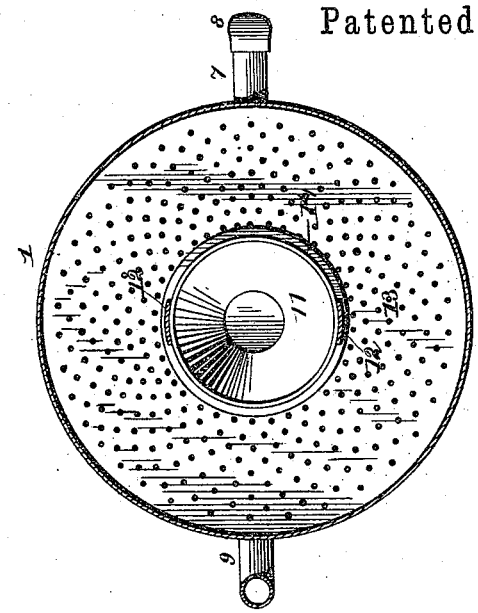
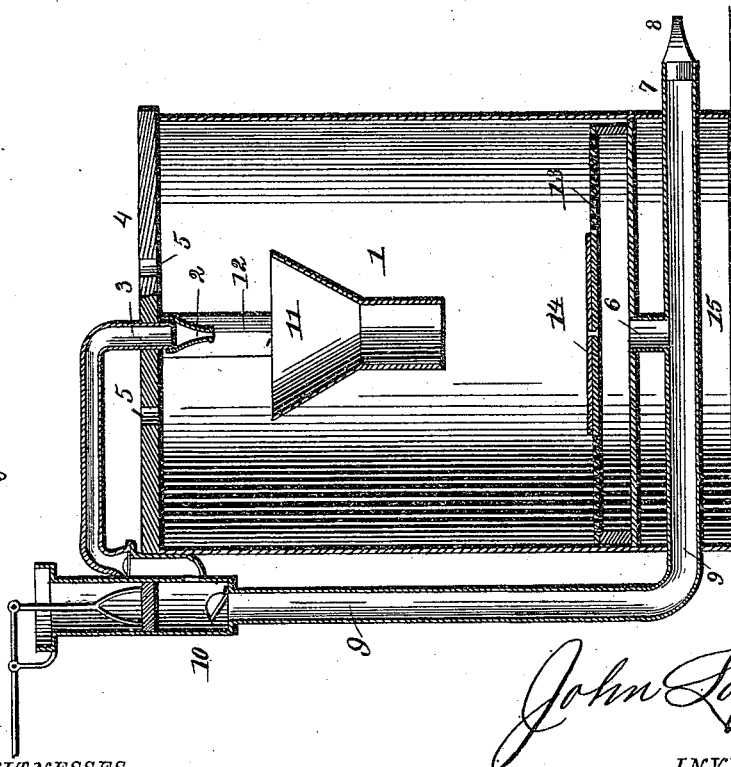
WITNESSES
INVENTOR

UNITED STATES PATENT OFFICE.

JOHN LOFTUS, OF ALBANY, NEW YORK, ASSIGNOR OF ONE-HALF TO PETER KINNEAR, OF SAME PLACE.

DEVICE FOR SEPARATING CREAM FROM MILK AND CHURNING THE CREAM.

SPECIFICATION forming part of Letters Patent No. 356,003, dated January 11, 1887.

Application filed September 20, 1886. Serial No. 214,009. (No model.)

*To all whom it may concern:*

Be it known that I, JOHN LOFTUS, a citizen of the United States, and a resident of Albany, in the county of Albany and State of New York, have invented certain new and useful Improvements in Devices for Separating Cream from Milk and Churning the Cream; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of my improved device for separating the cream from the milk and for churning the cream, and Fig. 2 is a horizontal sectional view of the same.

Similar numerals of reference indicate corresponding parts in both the figures.

My invention has relation to a device for separating cream from milk and for churning the cream; and it consists in the construction and combination of parts for accomplishing the said results, as hereinafter more fully described and claimed.

In the accompanying drawings, the numeral 1 indicates a vessel, preferably cylindrical, and having a discharge-nozzle, 2, projecting downward from a pipe, 3, through a cover, 4, having inlet-apertures 5, or through a cross-bar placed over the open top of the vessel, and the bottom of this vessel is provided at its center with an outlet-pipe, 6, having a tapping-pipe, 7, extending to one side and provided with a plug, 8, or stop-cock, and a branch, 9, forming a continuation of the tapping-pipe and extending to the other side, entering the feed end of a pump, 10, of suitable construction, having its discharge through the pipe 3 into the discharge-nozzle.

A funnel-shaped or bell-mouthed tube, 11, is supported from the cover by suitable braces, 12, with its flaring mouth upward, having its axis concentric with the discharge-nozzle, and a perforated bottom, 13, is supported above the bottom of the vessel, having a solid or imperforate portion, 14, at its center of a slightly-larger diameter than the flaring mouth of the tube.

The pipe leading from the bottom of the vessel to the pump is preferably passed through a casing, 15, containing ice, for the purpose of cooling the milk, although this is not absolutely necessary, merely assisting and hastening the separation of the cream from the milk and of the butter from the buttermilk.

The vessel is filled with milk to such a height as to cover the upper end of the bell-mouthed tube, whereupon the pump is started and the milk will be drawn from the vessel to the pump, which again will force it through the discharge-nozzle down through the bell-mouthed tube, the jet of milk carrying a quantity of air with it by passing through the space above the milk and forcing the said air through the milk in the vessel, the jet striking the imperforate portion of the false bottom and creating an upward current through the milk upon the outside of the tube. This operation will cause the cream to separate from the milk, and the cream will rise to the surface, while the skimmed milk will remain in the lower portion of the vessel, from which it may be drawn off through the tapping-pipe.

After the milk has been drawn off the vessel is filled with cold water until the contents of the vessel will reach above the upper end of the bell-mouthed tube, when the pumping is resumed and the cream forced in a jet mixed with air until the butter-globules will separate and collect around the tube by the upward force of the counter-current.

When the butter is formed, a quantity of the water and buttermilk is drawn off sufficient to uncover the upper end of the bell-mouthed tube, and the pumping continued until the butter collects around the tube.

When it is only desired to separate the cream from the milk without churning the cream, the vessel is only filled sufficiently high to leave the upper end of the bell-mouthed tube uncovered, when the upward current and the flow of the milk over the upper end of the tube will not be created, which current breaks the butter-globules, which it is desired to avoid, as it would spoil the cream for other use than churning, and the milk may be drawn off from the cream when separated, whereupon the cream may be drawn off, each article being ready for consumption without any loss of time taking place in leaving the cream to rise in the usual manner standing in vessels, the skimmed milk produced by this process being fresh and sweet.

Where large quantities of milk are to be treated, several discharge-nozzles may be used, all discharging jets into one bell-mouthed tube, and similar changes may be made in the construction of the device without departing from the spirit of my invention.

The imperforate portion of the false bottom serves to cause the upward current and to deflect the cream, and later the butter-globules upward, preventing them from passing through the perforated bottom into the pump, so that during the process the cream, and later on, the butter, will collect around the bell-mouthed tube without passing back to the pump, the milk only passing to the pump.

By using this device the milk may be treated directly as it comes from the cow, so that the skimmed milk and cream will be produced perfectly fresh and sweet without loss of time, and the butter produced from the sweet cream will be superior to the butter produced from cream separated by allowing the milk to stand until the cream has risen.

The cream may of course be separated from the milk by the centrifugal process, and thus be produced directly without loss of time; but this apparatus is simpler of construction and may be produced at considerably less cost than a centrifugal creamer, and will also require less power than the said creamer, so that the device will be within reach of persons possessed of less capital than is required for the purchase of a centrifugal creamer and its motive power.

Having thus described my invention, I claim and desire to secure by Letters Patent of the United States—

1. In a device for separating cream from milk and for churning the cream, the combination, with a suitable vessel provided with a discharge-pipe at its bottom, of an inlet-nozzle passing through the center of the cover of said vessel, a bell-mouthed tube located with its flaring end upward within the vessel and under said nozzle, and a suction and force pump connected at its lower end to said discharge-pipe, and by its spout to the inlet-nozzle, substantially as and for the purpose set forth.

2. In a device for separating cream from milk and for churning the cream, the combination of a vessel having an outlet at the center of its bottom, a pump having its feed-pipe connected to the outlet and having a discharge-nozzle at the center of the open upper end of the vessel, a bell-mouthed tube supported with its flaring mouth upward below the discharge-nozzle, and a perforated false bottom having a central imperforate portion, as and for the purpose shown and set forth.

3. In a device for separating cream from milk and for churning the cream, the combination of a cylindrical vessel having an outlet-pipe in its bottom, a pipe extending transversely at the end of the discharge-pipe and having a plug or cock at one end and extending upward at the other end, a bell-mouthed tube supported with its flaring mouth upward at the center of the vessel, a perforated false bottom supported above the bottom of the vessel and having an imperforate central portion, a discharge-nozzle at the center of the open top of the vessel pointing downward, and a pump having its inlet from the transverse pipe at the outlet thereof and having its discharge-opening into the tube of the discharge-nozzle, as and for the purpose shown and set forth.

In testimony that I claim the foregoing as my own I have hereunto affixed my signature in presence of two witnesses.

JOHN LOFTUS.

Witnesses:
ARTHUR L. ANDREWS,
CHRISTIAN L. KATBREIN, Jr.